United States Patent Office 3,456,033
Patented July 15, 1969

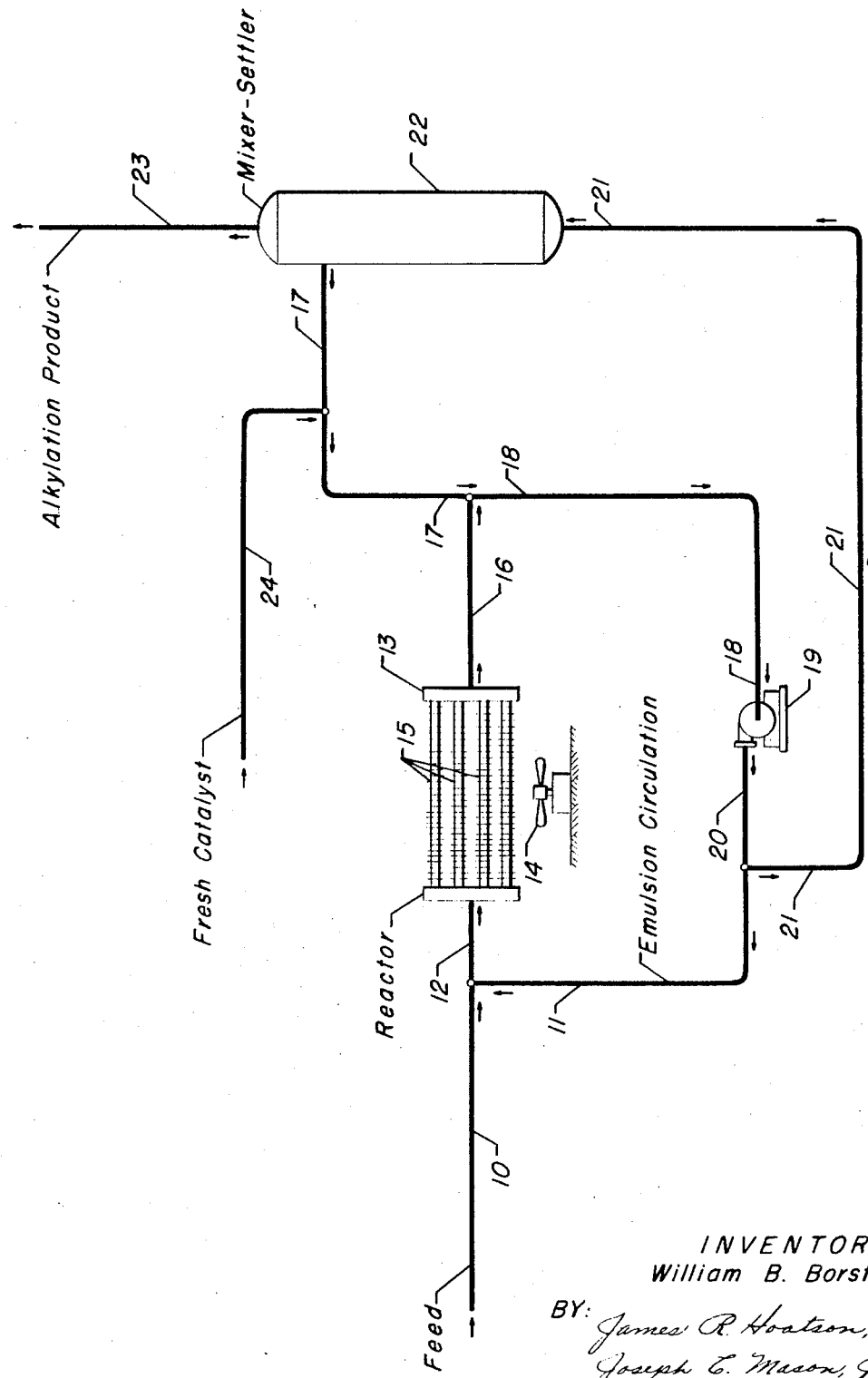

3,456,033
ALKYLATION PROCESS UTILIZING AN AIR-COOLED REACTOR
William B. Borst, Jr., Mount Prospect, Ill., assignor to Universal Oil Products Company, Des Plaines, Ill., a corporation of Delaware
Filed Feb. 28, 1967, Ser. No. 619,230
Int. Cl. C07c 3/52, 11/00
U.S. Cl. 260—683.48                                   8 Claims

ABSTRACT OF THE DISCLOSURE

Process for producing alkylated hydrocarbons such as the reaction product of isobutane and butylene using an acid catalyst such as hydrogen fluoride. The reaction takes place in an air-cooled tubular reactor. The heat of reaction is removed by the air passing over the tubes and by maintaining a relatively high pumped rate of effluent emulsion circulation through the tubes of the reactor.

BACKGROUND OF THE INVENTION

This invention relates to a catalytic alkylation process. It also relates to an improved process for the production of an isoparaffin-olefin reaction product. It specifically relates to a process for the alkylation of an isobutane stream with a butylene stream using hydrofluoric acid (HF) as the catalyst in a heat exchanged tubular reactor.

Production of higher molecular weight isoparaffin hydrocarbons having valuable anti-knock properties as motor fuel is of considerable importance to the petroleum refining industry. Furthermore, the introduction of automobile engines of high compression ratios has necessitated the utilization of high anti-knock fuel in these engines to obtain efficiency therefrom. Thus, the demand for higher and higher octane number motor fuels has led to the increased use of higher molecular weight isoparaffin hydrocarbons as blending agents in motor gasoline.

A convenient source of such higher molecular weight isoparaffin hydrocarbons is the catalytic alkylation of low boiling isoparaffins such as isobutane with olefin hydrocarbons such as, for example, propylene, the butylenes, the amylenes, and various mixtures thereof.

In practice there have been numerous process schemes advanced by the prior art for accomplishing the alkylation reaction, but it is extremely difficult to achieve a process scheme which embodies all of the desirable features of a completely optimum reaction. Optimizing the alkylation reaction is complicated by the fact that the reaction, if not carried out properly, has many side reactions, such as polymerization, which destroy the effectiveness of the reaction and which inhibit the production of commercial quantities of desired alkylated hydrocarbons. Additionally, the reaction, in order to be carried out commercially, requires a tremendous amount of auxiliary equipment for the recovery of alkylated hydrocarbons and for the regeneration and reuse of the excess acid catalyst and excess reactants, such as isobutane, which have passed through the reaction system. Furthermore, the alkylation reaction generally takes place in the presence of an acid catalyst; the handling of which requires extreme caution and precise materials of construction in order to minimize corrosion problems and personal hazard problems.

A particular difficulty with the alkylation reaction, as practiced by those skilled in the art, is that the reaction itself is exothermic and therefore effects a rapid evolution of heat which causes local overheating within the reaction vessel. Such local overheating is injurious to the quality of the alkylated hydrocarbons produced and in some cases is injurious to the yield of the alkylate produced. In almost every instance, so far as is known, the prior art alkylation reaction has either heat exchange means, such as circulating water within the tubes of the reaction vessel, in order to remove this heat of reaction as rapidly as possible or the prior art utilizes pre-cooled reactants which are lowered in temperature to such an extent that the heat of reaction does not unduly cause the reaction medium to elevate in temperature to a point of degradating reaction efficiency. In all instances, therefore, the prior art schemes have internally and externally heat exchanged the acid catalyst and/or reaction feedstocks and/or the reaction zone itself, usually with water, in order to remove the heat of reaction.

However, the use of water as a cooling means, while admittingly effective, is extremely hazardous in that any leakage within the heat exchange system would cause water-acid contact thereby greatly increasing corrosion problems within the reaction system and/or greatly increasing the prospects of water pollution in those areas where the effluent water is returned to a source, such as a river or lake. Additionally, the use of water as a heat exchange medium presents considerable problems in those areas of the world which are arid in nature thereby having a water scarcity. In such arid areas it is normal practice to reuse the water as much as possible, and in some cases has resulted in a decision not to construct a chemical alkylation plant in the area because, for practical purposes, there is no water available for such cooling.

Another important difficulty with the alkylation reaction is that the catalyst and reactants are substantially immiscible fluids. Accordingly, the efficient reaction requires extremely intimate mixing of the catalyst and reactants. Usually, this is performed in the reaction vessel by the use of baffle means which create relatively large pressure drop through the vessel itself. It follows, therefore, that another desirable feature of a reaction vessel and process is to provide means for intimately mixing substantially immiscible fluids while simultaneously providing control over the reaction, such as by removing the exothermic heat of reaction as rapidly and efficiently as possible.

SUMMARY OF THE INVENTION

It is, therefore, an object of this invention to provide an improved process for carrying out a catalytic alkylation reaction.

It is another object of this invention to provide a process for producing alkylated hydrocarbons wherein hydrogen fluoride is used as the catalyst.

It is still another object of this invention to provide a process for producing an isoparaffin-olefin reaction product in a more facile and economical manner.

It is a particular object of this invention to provide a process for producing an isobutane-butylene reaction product in a reactor system which comprises a heat exchanged tubular reactor for removing the heat of reaction.

Thus, according to the present invention, there is provided a process for producing alkylated hydrocarbons which comprises passing alkylatable hydrocarbon and alkylating agent into at least one tube of a multiple-tube heat exchanged reaction zone maintained under alkylation conditions including the presence of alkylation catalyst; passing gaseous heat exchange medium across said tube under conditions sufficient to maintain the material within said tube at substantially constant temperature; withdrawing from said tube an alkylation reaction effluent stream containing alkylated hydrocarbons; admixing the effluent with hereinafter specified recycle alkylation catalyst stream; emulsifying said admixture; passing a portion of the emulsified admixture into said tube as a recycle stream with the alkylatable hydrocarbons; separating the remainder of the emulsified admixture into an alkylated hydrocarbon-containing fraction and an alkylation catalyst-containing fraction; recycling at least a portion of the separated catalyst fraction into said effluent as specified; and, recovering alkylated hydrocarbons in high concentration from said separated hydrocarbon fraction.

Another broad embodiment of the invention is the process hereinabove specified wherein said gaseous heat exchange medium is selected from the group consisting of air, hydrogen, nitrogen, carbon dioxide, and normally gaseous hydrocarbons.

Thus, the present invention is based upon the concept that the heat of reaction from the alkylation reaction is immediately removed by a gaseous heat exchange medium, such as air, and by maintaining a relatively high effluent emulsion circulation rate through the tubes of the reactor. By operating in this manner it can be seen that there is no opportunity for acid-water contact and there is a minimum of pumping equipment and valves, etc. for acid leakage problems to develop.

As stated previously, this invention relates to an improved process for the production of an isoparaffin-olefin reaction product. Although the present invention is particularly applicable to he alkylation of an isobutane hydrocarbon with a butylene hydrocarbon, it is also applicable to other isoparaffinic and other olefinic hydrocarbon feedstocks. Thus, other paraffinic hydrocarbons such as isopentane, one or more of the isoheptanes, or mixtures of the aforementioned isoparaffin branched-chain heptanes and other aliphatic hydrocarbons of branched-type and chain structure may be utilized as feedstocks. Similarly, as olefinic hydrocarbons reactants the normally gaseous olefin hydrocarbons including propylene, 1-butylene, 2-butylene, isobutylene, the isomeric amylenes, the hexenes, the heptenes and higher molecular weight olefin hydrocarbons may be utilized as olefin hydrocarbons reactant in the inventive process.

The operating conditions for the alkylation reaction are conventional and well-known to those skilled in the art. Generally, the alkylation reaction occurs at a temperature from 0° F. to about 200° F., preferably, from about 30° F. to about 110° F. The pressure on the alkylation system is ordinarily just high enough to maintain the hydrocarbon and catalyst in substantially liquid phase. Suitable pressures would therefore, from about atmospheric to about 40 atmospheres, or more typically, the pressure will be within the range of about 200 p.s.i.g. for the case of isobutane alkylation with butylene. The contact time in the reaction zone conventionally will be less than 5 minutes, and preferably, less than about 2 minutes.

The alkylation reaction is conducted in the presence of a catalyst, such as hydrogen fluoride, generally, in an amount sufficient to provide a catalyst-to-hydrocarbon volume ratio in the alkylation reactor of about 0.5 to about 2.5. Similarly, in order to reduce the tendency of the olefinic portion of the feed mixture to undergo polymerization prior to alkylation, the molar proportion of isoparaffin hydrocarbon to olefin hydrocarbon in the alkylation reactor is generally maintained at a value from about 1:1 to about 20:1, preferably, from about 3:1 to about 15:1.

It is to be noted that the present invention utilizes a gaseous heat exchange medium for removing the heat of reaction from the reactor vessel. Typically, the reactor comprises a plurality of finned tubes which have exterior open communication to the atmosphere. In other words, the reaction between the hydrocarbons in the presence of the acid catalyst takes place on the inside of the tubes. The gaseous heat exchange medium is passed over the outside of the tubes such as by fan means or compressor means in order to remove the heat of reaction. Any readily available gaseous material can, of course, be used in this manner. Typically, this gaseous heat exchange medium may be air, hydrogen gas, nitrogen gas, carbon dioxide gas, normally gaseous hydrocarbons, and the like. From the availability and convenience standpoint, it is distinctly preferred to use air as the heat exchange medium in the practice of this invention. The air is passed across the heat exchange tubes which are, typically, finned to increase the heat exchange or transfer surface, using a fan means. The amount of heat exchange medium, such as air, which is passed across the tubes of the reactor can be varied over a wide range; the specific amounts of which are not critical, as long as the material within the tubes of the reactor is maintained at substantially constant temperature. Therefore, it can be seen that, in many respects, the gaseous medium is the sole heat exchange means used to remove the heat of reaction. However, it is an important facet of the present invention that a relatively high amount of emulsion is circulated through the tubes of the reactor in order to act as a heat sink to absorb, to some extent, the heat of reaction.

Thus, the present invention is based on the combination concept of utilizing a gaseous heat exchange medium exterior to the reaction zone and large emulsion circulation rate within the reaction zone in order to control the temperature of the reaction by rapid removal of the heat of reaction.

It was found that by operating in this manner there was sufficient mixing (and turbulence) of the reactants and catalyst within the tubes of the reactor so that an efficient alkylation reaction could take place. Complementary to this fact was the evidence that the reaction could be efficiently accomplished with considerably less pressure drop through the reaction zone than had heretofore been possible. Of course, the decrease in pressure drop results in a considerable savings in pumping costs for equivalent efficiency of reaction. In fact, it was discovered that the present invention process could be operated with a pressure drop through the reaction zone of less than 10 p.s.i.g. and typically, within the range from 2 to 5 p.s.i.g.

As will be more fully discussed with reference to the illustrative embodiment hereinbelow, it is to be noted at this point that the amount of emulsion circulation within the reaction zone circuit can be varied considerably depending upon the degree to which the heat of reaction must be removed, over and above that economically removed by passing the gaseous heat exchange medium across the tubes of the reactor. Satisfactory operation of the present invention can be achieved with a volume ratio of emulsion circulation between 1:1 and 5:1, preferably, about 2:1 to 4:1. As used herein the term "volume ratio of emulsion circulation" is defined as the ratio of the volume of emulsion returned to the feed point of the reaction zone as circulation to the volume of emulsion passed into the subsequent separation zone for recovery therefrom of the alkylated hydrocarbon product and recycle catalyst stream.

The mechanical configuration of the tubular reactor is not critical in the practice of this invention. It is only essential that the alkylation reaction take place within the tubes of the heat exchanged reactor rather than exterior of the tubes as is currently the practice of the prior art.

DESCRIPTION OF THE DRAWING

The objects and advantages of the present invention will be more clearly understood from the description presented below with reference to the appended drawing which is a diagrammatic representation of apparatus for practicing one embodiment of the invention.

Referring now to the drawing, an isoparaffin-olefin hydrocarbon stream is passed via lines 10 and 12 into tubular reactor 13. Recycle emulsion comprising alkylated hydrocarbons, alkylating agent, and acid catalyst is also passed into reactor 13 via lines 11 and 12 along with the feed hydrocarbons.

The feed hydrocarbons together with sufficient acid catalyst are passed into reactor 13 and subsequently through finned tubes 15 within which the alkylation reaction takes place. Fan 14 generates sufficient air flow across fin tubes 15 so that a substantially constant temperature is maintained within tubes 15.

A reaction zone effluent containing excess acid catalyst, excess alkylatable hydrocarbons, and alkylated hydrocarbons is withdrawn from reactor 13 via line 16. A hereinafter specified acid catalyst stream is passed via line 17 into admixture with effluent stream from line 16. The combined admixture is passed via line 18 through pump 19 wherein the admixture is emulsified by the action of the pump. An emulsified admixture is withdrawn from the pump via line 20. A portion of the emulsified admixture is passed back to the reactor via lines 11 and 12. The balance or remainder of the emulsified admixture is then passed via line 21 into vertical mixer-settler 22 for passage upwardly therethrough. The mixture is passed upwardly through vertical mixer-settler 22 while simultaneously maintaining the mixture in the lower portion of the settler vessel for an average residence time of from 60 seconds to about 1200 seconds depending upon the composition of the emulsified mixture charged to vessel 22. Of course, other separation devices known to those skilled in the art may be used to separate this portion of the emulsified mixture into an alkylated hydrocarbon-containing stream and an alkylation acid catalyst-containing stream. Following separation, a hydrocarbon stream containing alkylated hydrocarbons is withdrawn from mixer-settler 22 via line 23 for subsequent recovery of the alkylated hydrocarbons therefrom by means well-known to those skilled in the art.

The separated acid catalyst stream is withdrawn from mixer-settler vessel 22 via line 17 and passed into admixture with the total effluent stream removed from reactor 13 via line 16 as hereinabove specified. Fresh acid catalyst as needed can be added to the system, for example, via line 24.

When operating in isobutane-butylene alkylation unit in the manner described, utilizing the process of the present invention, an alkylate product having an end point below 400° F. and an octane number (F–1 plus 3 cc. of TEL per gallon of alkylate) of at least 105 is obtained with a hydrogen fluoride catalyst consumption of less than 0.2 pound of catalyst per barrel of alkylate produced. Additionally, significant economy of operation is achieved over the processing schemes taught by the prior art.

As previously mentioned, the invention contemplates the employment of any suitable catalyst material in addition to hydrofluoric acid such as, sulfuric acid, mixtures of sulfuric acid and phosphoric acid, hydrofluoric acid and certain complexes of aluminum chloride and boron fluoride. It is distinctly preferable, however, in the practice of this invention to use hydrofluoric acid or hydrogen fluoride as the catalytic mass. As used herein the term "hydrogen fluoride catalyst," or words similar thereto, is intended to include catalyst wherein hydrogen fluoride is the essential active ingredient. Thus, it is within the scope of this invention to employ substantially anhydrous hydrogen fluoride (or hydrofluoric acid) or hydrogen fluoride containing various additives and/or promotors such as boron trifluoride. Ordinarily, commercial hydrogen fluoride will be charged to the alkylation system as fresh catalyst; however, it is possible to use hydrogen fluoride containing as much as about 3% by volume water or more. It is to be noted, however, that excessive dilution with water is generally undesirable since it tends to reduce the alkylating activity of the catalyst and introduces corrosion problems into the apparatus.

DESCRIPTION OF THE PREFERRED EMBODIMENT

From the description of the invention presented hereinabove it can be seen that the present invention provides a process for producing alkylated hydrocarbons utilizing a unique tubular reactor system which has a gaseous heat exchange medium passing over the reactor for removal and control of the heat of reaction from the alkylation reaction.

Thus, the preferred embodiment of the invention provides a process for the production of isoparaffin-olefin hydrocarbon reaction product which comprises the steps of: (a) commingling an olefin feed reactant with isobutane to form an alkylation feed mixture comprising an isoparaffin-to-olefin molar ratio from 1:1 to 20:1; (b) introducing said feed mixture and hereinafter specified acid catalyst emulsion into the tubes of an elongated reaction zone comprising a plurality of tubular heat exchange means being exteriorly in open communication with the atmosphere, said reaction zone maintained under alkylation conditions including a temperature from 0° F. to 200° F.; (c) passing air as the heat exchange medium across the exterior of said tubular means under conditions sufficient to maintain the material within said reaction zone at substantially constant temperature; (d) withdrawing from said reaction zone at substantially said alkylation temperature an effluent stream containing isoparaffin-olefin hydrocarbon reaction product; (e) admixing the effluent with alkylation acid catalyst in an amount sufficient to provide a catalyst-to-hydrocarbon volume ratio in said reaction zone from 0.5 to 2.5; (f) emulsifying said admixture of Step (e); (g) passing a portion of the resulting acid catalyst emulsion to Step (b) as specified; (h) separating the remainder of the emulsion into a hydrocarbon stream containing said reaction product and an acid catalyst stream; (i) returning at least a portion of the separated acid catalyst stream to Step (e) for admixing with said effluent and; (j) recovering isoparaffin-olefin reaction product from said hydrocarbon stream.

An additional preferred embodiment of the invention includes the process hereinabove wherein said olefin comprises butylenes, said isoparaffin comprises isobutane, and said acid catalyst comprise hydrogen fluoride.

Still another embodiment of the invention includes the process hereinabove wherein the volume ratio of emulsion returned to the reaction zone from Step (g) to the emulsion remainder of Step (h) is from 1:1 to 5:1.

The invention claimed is:

1. Process for producing alkylated hydrocarbons which comprises passing alkylatable hydrocarbon and alklating agent into at least one tube of a multiple-tube heat exchanged reaction zone maintained under alkylation conditions including the presence of alkylation catalyst; passing gaseous heat exchange medium across said tube under conditions sufficient to maintain the material within said tube at substantially constant temperature; withdrawing from said tube an alkylation reaction effluent stream containing alkylated hydrocarbons; admixing the effluent with hereinafter specified recycle alkylation catalyst stream; emulsifying said admixture; passing a portion of the emulsified admixture into said tube as a recycle stream with the alkylatable hydrocarbon; separating the remainder of the emulsified admixture into an alkylated hydrocarbon-containing fraction and an alkylation catalyst-containing fraction; recycling at least a portion of the separated catalyst fraction into said effluent as specified; and, recovering alkylated hydrocarbons in high concentration from said separated hydrocarbon fraction.

2. Process according to claim 1 wherein said gaseous heat exchange medium is selected from the group consisting of air, hydrogen, nitrogen, carbon dioxide, and normally gaseous hydrocarbons.

3. Process according to claim 2 wherein said gaseous heat exchange medium is air.

4. Process according to claim 3 wherein said alkylatable hydrocarbon comprises isobutane and said alkylating agent comprises butylene, and said catalyst comprises hydrogen fluoride.

5. Process for the production of isoparaffin-olefin hydrocarbon reaction product which comprises the steps of:
    (a) commingling an olefin feed reactant with isobutane to form an alkylation feed mixture comprising an isoparaffin-to-olefin molar ratio from 1:1 to 20:1;
    (b) introducing said feed mixture and hereinafter specified acid catalyst emulsion into the tubes of an elongated reaction zone comprising a plurality of tubular heat exchange means, said tubular heat exchange means having an exterior surface in open communication with the atmosphere, said reaction zone maintained under alkylation conditions including a temperature from 0° F. to 200° F.;

(c) passing air as the heat exchange medium across the exterior of said tubular means under conditions sufficient to maintain the material within said reaction zone at substantially constant temperature;

(d) withdrawing from said reaction zone at substantially said alkylation temperature an effluent stream containing isoparaffin-olefin hydrocarbon reaction product;

(e) admixing the effluent with alkylation acid catalyst in an amount sufficient to provide a catalyst-to-hydrocarbon volume ratio in said reaction zone from 0.5 to 2.5;

(f) emulsifying said admixture of Step (e);

(g) passing a portion of the resulting acid catalyst to Step (b) as specified;

(h) separating the remainder of the emulsion into a hydrocarbon stream containing said reaction product and an acid catalyst stream;

(i) returning at least a portion of the separated acid catalyst stream to Step (e) for admixing with said effluent; and (j) recovering isoparaffin-olefin reaction product from said hydrocarbon stream.

6. Process according to claim 5 wherein said olefin comprises butylene, said isoparaffin comprises isobutane, and said acid catalyst comprises hydrogen fluoride.

7. Process according to claim 6 wherein the volume ratio of emulsion returned to the reaction zone from Step (g) to the emulsion remainder from Step (h) is from 1:1 to 5:1.

8. Process according to claim 6 wherein said alkylation temperature is from 30° F. to 110° F.

References Cited

UNITED STATES PATENTS 3,249,650    5/1966    Fenske _____ 260—683.48

DELBERT E. GANTZ, Primary Examiner

G. J. CRASANAKIS, Assistant Examiner

U.S. Cl. X.R.

23—288